United States Patent [19]
Garrett

[11] 3,814,536
[45] June 4, 1974

[54] BORING BAR

[76] Inventor: Paul A. Garrett, Box 462, Cowpens, S.C. 29330

[22] Filed: Sept. 27, 1972

[21] Appl. No.: 292,815

[52] U.S. Cl.................................. 408/157, 408/161
[51] Int. Cl....................... B23b 29/034, B23q 3/00
[58] Field of Search............ 408/161, 157, 188, 153

[56] References Cited
UNITED STATES PATENTS

| 2,076,663 | 4/1937 | Miller | 408/153 |
|---|---|---|---|
| 2,605,655 | 8/1952 | Kaiser | 408/157 |
| 2,878,695 | 3/1959 | Busch | 408/153 |
| 3,711,216 | 1/1973 | Zurcher | 408/153 |

Primary Examiner—Francis S. Husar
Attorney, Agent, or Firm—Wellington M. Manning, Jr.

[57] ABSTRACT

A boring tool is disclosed and claimed herein that utilizes indexible and replaceable polygonal cutting inserts. The inserts are preferably triangular and are received in a slot in the forward, cutting end of a tool. A mounting plate is secured within the slot and provides rigidity for the cutting inserts. Adjustment means are provided which cooperate with the mounting plate to position the cutting inserts simultaneously at a predetermined position to set the cutting diameter of the tool at a predetermined amount. Cutting inserts are thus adjusted to provide the proper diameter cut with removal from the tool.

10 Claims, 6 Drawing Figures

BORING BAR

BACKGROUND OF THE INVENTION

Various and sundry tools have heretofore been designed for the boring or reaming out of holes in metal parts during milling, in castings and the like. These tools must be extremely precise, especially when used to produce openings in which close tolerances are required for successful utilization of the product. Moreover, the cutting of metal, of course, requires an extremely hard cutting edge to realize reasonable useable life from the cutting edge.

Several approaches to improving cutting tools have been made. Included is the advent of the multisided cutting insert which may be polygonal in shape and especially rectangular or triangular in shape. These inserts can be rotated so as to utilize all of the edges of the insert for cutting. For example, a triangular insert provides six cutting edges, two on each of the three legs of the triangle, a rectangular insert affords eight cutting edges. Hence, after one edge has become spent through use, the insert may be removed from the tool and rotated by an appropriate amount so as to provide a new, sharp cutting edge for additional work. In this fashion, the useful life of the cutting insert is prolonged and time is saved in general by reindexing the new edge as opposed to the repositioning of a new insert in the tool. Different type arrangements have been provided for properly positioning the cutting insert to enable ease of indexing the different edges. In general, such attempts are achieved by some means to rigidly secure the cutting insert to the tool so as to present the proper edge for cutting.

Another problem historically existent in the use of boring tools is lack of easy adjustability, for reaming or cutting openings of different diameters. Normally speaking the industry has utilized a different tool size with different insert sizes for the various diameter openings. Additionally, single tools are available which permit the cutting diameter thereof to be varied manually by trial and error. This tool requires the repositioning of the cutting edge with respect to the tool using a micrometer or the like to determine when the proper cutting width is established between the outer limits of the one or more cutting edges that are employed. Once the proper cut is established, the inserts are then again rigidly secured to the tool body. In this regard, a conventional technique for the cutting tool is the placement of at least two cutting edges on the tool, each being positioned on an opposite side of the tool from the other. Hence, the movement of one insert in any direction requires the like movement of the opposite insert in the same direction so as to insure even cutting around the periphery of the rotational path of the tool.

Utilization of prior art cutting tools in the foundry and other industries, is thus quite cumbersome and time consuming. Changing from one diameter cut to another diameter cut, requires a prolonged shut down of the machine while the boring tool is changed or while an individual comes to the machine and resets the tool by trail and error for the proper diameter cut.

The present invention represents a substantial improvement over the prior techniques mentioned above. An improved cutting tool is provided that utilizes indexible cutting inserts having multiple edges, preferably triangular. A primary advantage of the present tool is the ability to simultaneously move opposite cutting inserts outwardly or inwardly by like amounts. The cutting diameter of the tool can thus be quickly and more accurately adjusted. Likewise, the present tool affords the ability of quickly changing the cutting edge of the insert or replacement of the insert without resetting or rechecking the cutting diameter of the tool after the change.

There is no teaching or suggestion in the prior art of the improved boring tool according to the teachings of the present invention. Exemplary of the relevant prior art are U. S. Pat. No. 1,294,257 to Germonprez; No. 2,040,273 to Rottler; No. 2,958,241 to Wahli; No. 3,125,799 to Bennett; No. 3,295,187 to Plummer; No. 3,376,763 to Welles; No. 3,540,324 to Johansson and No. 3,590,671 to Wahli.

SUMMARY OF THE INVENTION

It is an object of the present invention to provide an improved boring tool.

Another object of the present invention is to provide an improved boring tool that affords ease of replacement of cutting inserts therein.

Still another object of the present invention is to provide an improved boring tool that is capable of automatic adjustment of the cutting diameter of the tool.

Generally speaking, the present invention relates to a boring tool comprising a tool body; at least one cutting insert removably received in an end of said body; a mounting plate received in said end of said body and supporting said at least one insert; and means to adjustably position said cutting insert at a predetermined location with respect to said mounting plate and said body whereby the cutting diameter of said body may be adjusted as desired.

More specifically, the boring tool of the present invention is preferably designed to accept two triangular cutting inserts where opposite offset cutting edges extend beyond the forward end of the body of the cutting tool. The cutting inserts of triangular shape are received in a slot at the forward end of the tool body and are held at the proper position thereat by the dimensional tolerance of the slot and by a mounting plate that is also received in the slot. The mounting plate is provided with V shaped slots for the triangular cutting insert, thus providing a supporting plane along each side of the insert. An adjustment member is provided having an arm adjacent each V shaped slot of the mounting plate, each arm having a taper corresponding to the plane of the slot and being in engagement with the side of the insert. Axial upward movement of the adjustment member causes the insert to move axially outwardly of the tool body, sliding along the opposite plane of the V shaped slot. Likewise inward axial movement of the adjustment member permits the insert to be forced axially inwardly, decreasing the cutting diameter.

The adjustment member, from a practical standpoint is effective for moving the insert only a small amount, dependent upon the size of the insert. Further, while numerous means may be employed for advancing the adjustment means, a threaded member is preferred. Such a threaded member may be received in a complementary threaded opening in the tool body where threaded movement of the threaded member will force the adjustment member against the inserts and advance them an appropriate amount. Likewise, withdrawal of the threaded member permits forcing of the adjustment member inwardly until contact therebetween is reestablished. Most preferably threaded member is angularly disposed with respect to the adjustment member.

DESCRIPTION OF THE PREFERRED EMBODIMENTS

Figure 1:
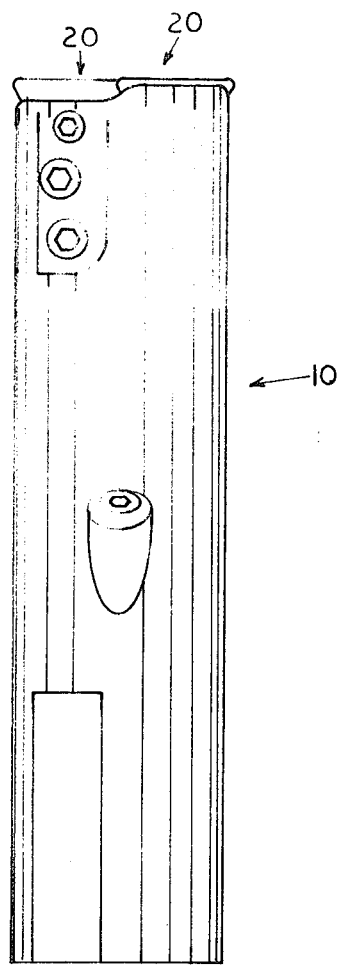
FIG. 1 is a front elevational view of a boring tool according to the teachings of the present invention.

Referring to the figures, specific embodiments of the present invention will now be described in detail. FIG. 1 shows a boring tool according to the teachings of the present invention that is ready for fixation to a machine for using same. The boring tool comprises a tool body indicated generally as 10 having a pair of cutting inserts indicated generally as 20 received in a forward end thereof and presenting cutting edges such that upon rotation of body 10, a cut of a predetermined diameter will be made, the diameter of the cut corresponding to the distance between the outer edges of inserts 20. Cutting inserts 20 are freely received within a slot in the forward end of tool body 10, though they are held in place by body 10 and close tolerance fits as will be described hereinafter. According to the present invention, cutting inserts 20 may be moved axially up or down with respect to tool body 10 so as to vary the cutting diameter of the tool. Moreover, this adjustment may be made quite simply and quite quickly so as to avoid the necessity of replacement of inserts, trial and error placement followed by measurement with a micrometer so as to eventually reach a particular diameter, and the like. Further, adjustment of the instant tool may be accomplished while the tool is still mounted on the boring machine. Likewise, the present invention enables easy removal of cutting inserts 20 for the complete replacement thereof or for the repositioning thereof so as to position a further cutting edge in proper location for cutting a hole of a predetermined diameter. In this regard, replacement of the inserts may be conveniently achieved so as to replace a completely spent insert or to move a spent edge away from the direction of cut and position a new cutting edge thereat without the necessity of readjusting the cutting diameter of the tool.

Figure 4:
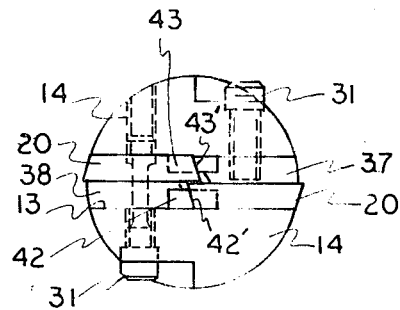
FIG. 4 is a top plan view of a boring tool according to the teachings of the present invention.
Figure 3:
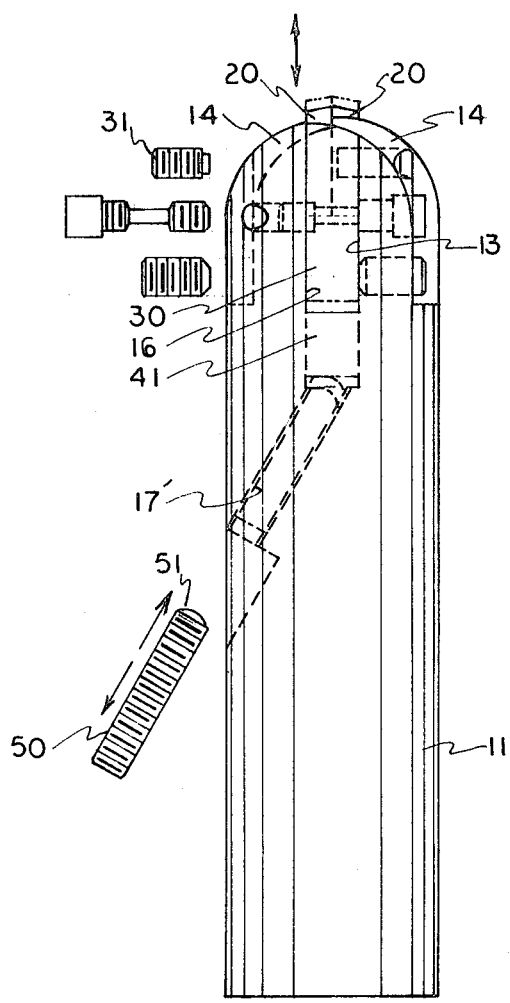
FIG. 3 is a partially exploded side elevational view of a boring tool according to the teachings of the present invention.
Figure 2:
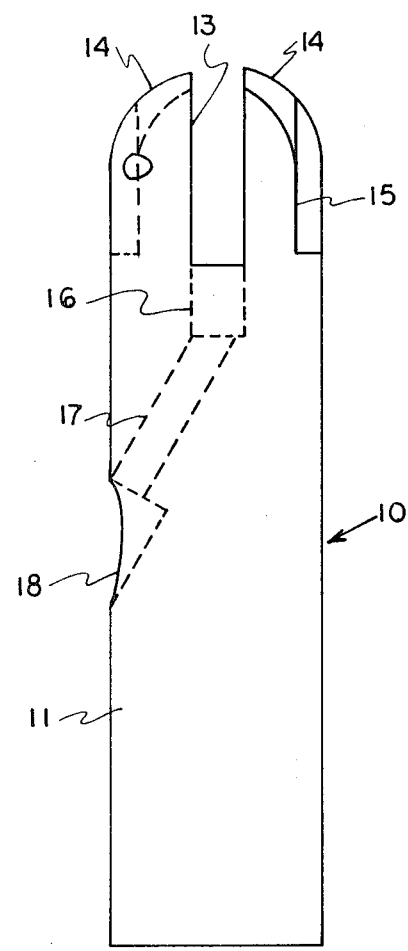
FIG. 2 is a side elevational view of a tool body according to the teachings of the present invention.

FIGS. 2, 3 and 4 better illustrate the present invention in detail. Referring specifically to FIG. 2, tool body 10 is comprised of an elongated member 11 having a slot 13 received in a forward end thereof. Slot 13 runs axially with respect to body member 11 and has an opening 16 extending from the bottom thereof axially into body member 11. A second opening 17 is provided in body member 11, angularly disposed with respect to first opening 16 and in open communication between opening 16 and a cutaway 18 out of body member 11. The forward end of tool body member 11, adjacent slot 13 is provided with beveled shoulders 14. Shoulders 14 are beveled so as to provide support immediately behind cutting insert 20 and to taper away towards the opposite side of member 11 so as to expose an oppositely positioned, offset cutting member 20. Shoulders 14 thus define slot 13 and limit movement of cutting inserts 20 in a direction transverse to the axis of tool 10. Since cutting inserts 20 are freely received in slot 13, shoulders 14 play an important part in the success of the tool of the present invention. Body member 11 further has a cut out section 15 adjacent the forward end thereof so as to facilitate the proper positioning of cutting inserts 20 therein.

Figure 5:
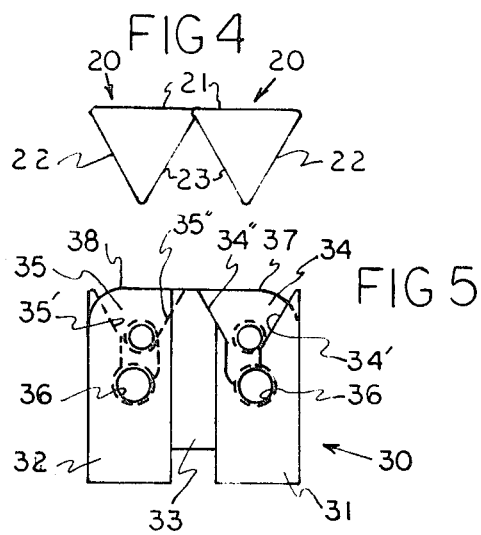
FIG. 5 is an exploded view of a portion of a boring tool according to the teachings of the present invention.
Figure 6:
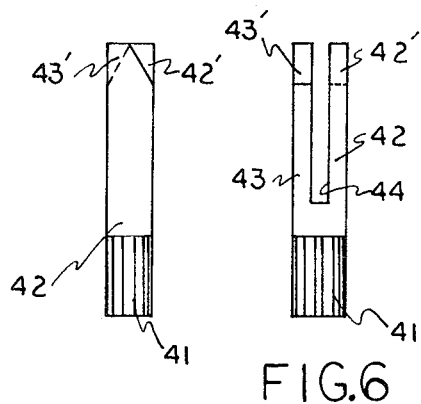
FIG. 6 is a side elevational view of a portion of a boring tool according to the teachings of the present invention.

A mounting plate generally indicated at 30 (See FIG. 5) is received in slot 13 of body member 11 and secured in place by set screws 31 or the like passing through section 15 of body 10. Mounting plate 30 preferably comprises a first mounting section 31 and a second mounting section 32 with a reduced thickness central portion 33 positioned therebetween. Mounting sections 31 and 32 have notches 34 and 35 respectively received in an upper end thereof, and offset from each other. The shape of the nothces 34 and 35 is such to receive cutting inserts 20 and provide support therefor throughout the adjustment range of the insert. As shown in FIG. 5, notches 34 and 35 are V shaped, having outer planes 34' and 35' and inner planes 34'' and 35'' respectively and thus continually provide support surfaces for cutting inserts 20 so as to properly position same with respect to the tool body 10 along the complete adjustment range. Mounting plate 30 further has a plurality of openings 36 which receive means exemplified by set screws 31 to secure the mounting plate rigidly to the tool body 10. Notches 34 and 35 are open from their respective sides of mounting plate 30 and extend inwardly to a backing 37 and 38 respectively for side support for cutting inserts 20. Cutting inserts 20 are thus received in notches 34 and 35 with two sides 22 and 23 slidably engaging the sloped sides of the notches. The outer sloped sides 34' and 35' of notches 34 and 35 thereafter provide an inclined plane upon which sides 22 of inserts 20 slide as they are adjusted upwardly to increase the cutting diameter of the tool. Reduced thickness section 33 between notches 34 and 35 reduces the thickness of the notches along the inside inclines 34'' and 35'' respectively, the purpose of which will be described hereinafter.

Mounting plate 30 is thus rigidly secured within slot 13 of tool body 10 and cutting inserts 20 are freely supported thereby so as to be offset with respect to the center line of tool body 10 and thus to provide two separate cutting edges for the tool. Still referring to FIG. 5, triangular cutting insert 20 are comprised of sides 21, 22 and 23, each of which has two cutting edges. As such, the inserts in triangular form which is the preferred form of polygonal insert according to the teachings of the present invention, can provide six separate cutting edges for the tool, each side of the insert providing two cutting edges. Cutting inserts 20 are thus freely received in notches 34 and 35 of mounting plate 30 so as to present the proper cutting edge beyond the forward end of the tool body 10, adjacent the lower beveled end of shoulders 14.

An adjustment member generally indicated as 40 is also received in slot 13 of tool body member 11 and extends into axial opening 16 that extends inwardly of body member 11. Adjustment member 40 comprises a lower cylindrical section 41 with arms 42 and 43 extending upwardly therefrom in a bifurcated manner, defining a slot 44 therebetween. The forward terminal ends of arms 42 and 43 are beveled at 42' and 43' respectively, the beveled edges coinciding with the inner sloped planes 34" and 35" of notches 34 and 35. Hence, adjustment member 40 is received along the reduced thickness section 33 of mounting plate 30 with arm 42 on one side of mounting plate 30 and arm 43 on the opposite side. The tapered sections 42' and 43' of arms 42 and 43 thus mate with slopes 34" and 35" of V shaped notches 34 and 35. As such, tapered edges 42' and 43' simultaneously position cutting inserts 20 at a predetermined location within notches 34 and 35 whereby both inserts are simultaneously set to provide a particular predetermined diameter cut.

Referring specifically to FIG. 3, it can thus be seen that cutting inserts 20 extend beyond the forward beveled shoulders 14 of body member 11. The inserts are received in the V shaped notches 34 and 35 (not shown) of mounting plate 30 with adjustment member 40 being positioned adjacent thereto and having lower cylindrical member 41 extending into axial opening 16 below slot 13. Angularly disposed opening 17 is provided with internal threads 17' along the length thereof. A threaded member 50 exemplified by a set screw is threadedly received within angularly disposed opening 17 and may be readily advanced therealong. The angular relationship with respect to threaded member 50 and lower cylindrical section 41 of adjustment member 40 thus permits bias movement of adjustment member 40 upwardly or downwardly depending upon the position of threaded member 50. Hence, with a forward end 51 of threaded member 50 in contact with cylindrical lower section 41 of adjustment member 40, cutting inserts 20 are positioned at a predetermined relationship within V shaped notches 34 and 35 of mounting plate 30. A turning of threaded member 50 to cause member 50 to move further into threaded opening 17, forces adjustment member 40 upwardly in opening 16 and consequently forces tapered edges 42' and 43' against sides 23 of inserts 20. Inserts 20 are thus forced upwardly along outer planes 34' and 35' of notches 34 and 35 while continuing to be supported by tapered terminal edges 42' and 43' of adjustment member 40 and outer planes 34' and 35' of mounting plate 30. Each insert 20 moves upwardly a like amount, thus automatically increasing the cutting diameter of tool 10.

Likewise, in an opposite sense, a withdrawal of threaded member 50 along opening 17 enables adjustment member 40 to be forced downwardly into axial opening 16 until contact is reestablished with threaded member 50. Cutting inserts 20 may then also be forced down, further in notches 34 and 35 of mounting plate 30. The cutting diameter of the tool is thereby reduced by like amounts at each insert. In this fashion, the cutting diameter of the tool may be accurately and automatically adjusted to arrive at a predetermined cutting diameter.

While advancing means for the adjustment member 40 has been illustrated to be threaded member 50, certainly other types of advancing means may be employed. Likewise, the particular design of each of the elements of the present invention will vary with the member of cutting inserts employed. A two insert tool is, however, preferred and is specifically illustrated herein by way of example.

The tool of the present invention is quite versatile for use in varied situations. For optimum performance, the tolerances of the various parts of the tool should be held very close. As such, very little play is experienced. This is especially important since the cutting inserts fit freely into the forward end of the tool without any means of rigid securement therein. Further, conventional materials of construction may be employed for producing the tool of the present invention.

Having described the present invention in detail, it is obvious that one skilled in the art will be able to make variations and modifications thereto without departing from the scope of the invention. Accordingly, the scope of the present invention should be determined only by the claims appended hereto.

I claim:

1. A boring tool comprising:
   a. a body;
   b. a mounting plate received in an end of said body, said plate having two V shaped notches provided thereon, said notches being offset from each other on opposite sides of said plate;
   c. a triangular shaped cutting insert received in each V shaped notch; and
   d. means to simultaneously adjustably position said cutting inserts at a predetermined location with respect to said mounting plate and said body whereby the cutting diameter of said body may be adjusted as desired.

2. A boring tool as defined in claim 1 wherein said mounting plate is received in a slot in said end of said body and is rigidly secured thereat.

3. A boring tool as defined in claim 2 wherein said adjustment means comprises a member residing within said body and movable axially therealong, said member having and edge complementary with a portion of each notch, and contacting said insert thereat.

4. A boring tool as defined in claim 3 wherein advancement means are provided in said body to force said adjustment means axially along said body, whereby said cutting insert may be displaced partially upwardly from said notch to expose a greater cutting surface at the end of said tool.

5. A boring tool as defined in claim 4 wherein said advancement means are threadedly received in said body, said means being angularly disposed with respect to said adjustment means.

6. A boring tool comprising:
   a. a body, said body having a slot received in one end thereof, said body further having an opening at the bottom of said slot, said opening extending axially along at least a portion of the length of said body;

b. a mounting plate received in said slot and secured therein, said mounting plate having a V shaped notch at opposite sides thereof, said notches being offset from each other;

c. a pair of triangular cutting inserts loosely received in said notches and being slidable therealong;

d. a bifurcated adjustment member received in said axial opening, the bifurcations extending around opposite sides of said mounting plate, forward ends of said bifurcations being tapered at an angle corresponding to the angle of one side of said notch adjacent thereto; and e. means for moving said adjustment member axially with respect to said body whereby said cutting inserts may be adjusted with respect to said notch to vary the cutting diameter of said tool.

7. A boring tool as defined in claim 6 wherein said advancement means comprises a set screw passing through a portion of said body and being angularly disposed with respect to said adjustment member.

8. A boring tool as defined in claim 6 wherein said body adjacent said slot is contoured to better expose the front of the cutting inserts extending therefrom and to support said inserts from the rear thereof.

9. A boring tool as defined in claim 1 wherein said adjustment means comprises a bifurcated member, each leg of said bifurcated member being engageable with one of said inserts.

10. A boring tool comprising:

a. a body;

b. a mounting plate received in one end of said body and having two V shaped notches provided thereon, said notches being offset from each other;

c. a cutting insert removably received in each V shaped notch; and d. bifurcated means to adjustably position said cutting inserts at a predetermined location with respect to said mounting plate whereby the cutting diameter of said body may be adjusted as desired, each leg of said bifurcated means being engageable with one of said inserts.

* * * * *